United States Patent [19]

Fredrickson

[11] E Re. 30,693

[45] Reissued Aug. 4, 1981

[54] PROCESS FOR INCREASING THE FILLING CAPACITY OF TOBACCO

[75] Inventor: James D. Fredrickson, Winston-Salem, N.C.

[73] Assignee: Reynolds Leasing Corporation, Jacksonville, Fla.

[21] Appl. No.: 558,674

[22] Filed: Mar. 17, 1975

Related U.S. Patent Documents

Reissue of:

[64] Patent No.: 3,524,451
Issued: Aug. 18, 1970
Appl. No.: 720,406
Filed: Apr. 10, 1968

[51] Int. Cl.[3] ..... A24B 3/18
[52] U.S. Cl. ..... 131/296
[58] Field of Search ..... 131/140 P; 426/445–450

[56] References Cited

U.S. PATENT DOCUMENTS

| | | | |
|---|---|---|---|
| 283,622 | 8/1888 | Liebreich | 131/143 |
| 1,577,768 | 3/1926 | Smith | 131/143 |
| 2,117,558 | 5/1938 | Hyatt | 131/143 |
| 2,227,863 | 1/1941 | Rhodes | 131/143 |
| 2,653,093 | 9/1953 | Baer | 131/140 P |
| 2,759,858 | 8/1956 | Baer | 131/140 P |
| 3,223,090 | 12/1965 | Strubel et al. | 131/140 C |
| 3,357,436 | 12/1967 | Wright | 131/135 |

FOREIGN PATENT DOCUMENTS

| | | | |
|---|---|---|---|
| 646439 | 8/1962 | Canada | 131/140 R |
| 680461 | 2/1964 | Canada | 131/140 P |

OTHER PUBLICATIONS

A.P.C. Application of Böhme, Ser. No. 304,214, published 5/11/1943 (aband.).

*Primary Examiner*—V. Millin
*Attorney, Agent, or Firm*—Neuman, Williams, Anderson & Olson

[57] ABSTRACT

Tobacco is impregnated with a volatile organic liquid and then heated by rapidly passing a stream of hot gas in contact therewith to volatilize the liquid and expand the tobacco. The hot tobacco contacting gas is at a temperature at least 30° F. above the boiling point of the said liquid.

11 Claims, No Drawings

PROCESS FOR INCREASING THE FILLING CAPACITY OF TOBACCO

Matter enclosed in heavy brackets [ ] appears in the original patent but forms no part of this reissue specification; matter printed in italics indicates the additions made by reissue.

This invention relates to a process for treating tobacco to increase its filling capacity.

Tobacco leaves, when harvested, contain a considerable quantity of water and during the tobacco curing process this water is removed by drying resulting in shrinkage of the leaf structure. In the usual process of preparing tobacco for storage and subsequent cigar and cigarette manufacture, the tobacco regains very little, if any, of the shrinkage resulting from drying so that a significant loss in the filling capacity of the tobacco is the result. Thus, the tobacco has a bulk density which is in excess of that necessarily required for making satisfactory cigars or cigarettes.

Several procedures have been suggested in the prior art for increasing the normal filling capacity of dried or cured tobacco. Certain of these processes involve puffing operations in which tobacco is subjected to high pressure steam followed by sudden release of the pressure. Also, it has been suggested that the filling capacity of tobacco may be increased i.e., bulk density reduced, by exposing the tobacco particles to the vapors of an organic liquid or to an organic liquid followed by air drying at ordinary temperatures. However, these prior procedures have not been wholly satisfactory because (a) they are not effective for expanding the filling capacity to any great extent or (b) they result in a shattering of the tobacco particles so that considerable waste incident to the formation of fines results.

Accordingly, an object of this invention is to provide a process for increasing the filling capacity of tobacco to an extent not heretofore readily obtainable.

A further object of this invention is the provision of a process for increasing the filling capacity of tobacco which avoids the shattering of the tobacco particles and the attendant formation of fines.

A further object of this invention is the provision of a process for expanding tobacco which may be readily carried out on conventional commercial equipment without the necessity of using high pressure.

An additional object of this invention is the provision of a process for increasing the filling capacity of tobacco which is broadly applicable to the treatment of leaf, strips, cut filler, stems or veins.

Further additional objects will appear from the following description and the accompanying claims.

In accordance with one embodiment of this invention, a cured tobacco product in the form of cut filler, leaf, strips, stems, veins or reconstituted tobacco is contacted with a sufficient quantity of a volatile organic liquid to thoroughly impregnate it. The tobacco is allowed to remain in contact with the volatile liquid, i.e., equilibrated, for a time sufficient for thorough impregnation to occur. Thereafter, the impregnated tobacco is brought into contact with a stream of gas which has been heated to an elevated temperature substantially above the boiling point of the volatile organic liquid whereby the liquid is rapidly volatilized and then separated from the tobacco by the gaseous stream in the form of a vapor. The moisture content of the resulting tobacco may then be further adjusted to the original level by conventional procedures. The bulk density of the final tobacco product is significantly less than that of the starting tobacco whereby its filling capacity is substantially increased. The entire process is readily carried out at atmospheric pressure. The hot gas used for vaporizing and removing the volatile liquid from the tobacco in the vapor state is preferably heated to a temperature at least 30° F. higher than the boiling point of the volatile organic liquid under the pressures obtained during heating in order to effect the desired expansion and rapid removal of liquid.

The process of this invention can be applied to cured tobacco in the form of leaf (including veins and stems), strips (leaf with stems removed) or cut filler (strips shredded for cigarette making). By using leaf or strips, the types or grades of tobacco can be selected for which the process is most effective, thereby achieving results near the maximum while holding processing costs to a minimum. If the entire blend is to be treated, then cut filler is preferably utilized.

The volatile organic liquids that may be used for impregnating tobacco in accordance with this invention preferably are those which are chemically inert to the tobacco being treated and unreactive toward the hot gas that comes into contact therewith during the vaporization step. The organic liquid may be miscible or wholly or partially immiscible with water and may be selected from a number of the well-known organic liquids that are available to the industry. As indicated, the liquid should be readily volatile, without leaving a residue, and have a boiling point under prevailing pressures at least 30° F. lower than the temperature of the hot gas used to treat the impregnated tobacco so that the tobacco particles are properly expanded and the liquid is rapidly removed in the vapor state.

Illustrative suitable inert organic liquids are: aromatic hydrocarbons such as benzene and toluene; ketones such as acetone, methyl ethyl ketone, methyl isopropyl ketone, diethyl ketone and diacetyl; aliphatic or cyclic ethers such as methyl ethyl ether, diethyl ether, dipropyl ether, diisopropyl ether, methyl butyl ether, ethyl butyl ether, ethylene glycol dimethyl ether, and tetrahydrofuran; aliphatic alcohols such as methanol, ethanol, propanol, 2-propanol, sec-butyl alcohol, t-butyl alcohol, t-amyl alcohol, and allyl alcohol; aliphatic hydrocarbons such as butane, pentane, hexane, heptane, and the corresponding unsaturated hydrocarbons; the cyclo aliphatic hydrocarbons such as cyclobutane, cyclopentane, cyclohexane and cyclohexene; the halohydrocarbons ethyl chloride, propyl chloride, isopropyl chloride, vinylidene chloride, n-butyl bromide, isobutyl chloride, sec-butyl chloride, t-butyl chloride, t-butyl bromide, methylene chloride, methylene bromide, chloroform, carbon tetrachloride, ethylene dichloride, ethylidene chloride, acetylene dichloride, trichloroethylene, flourobenzene, and the "Freon" liquids represented by trichloromonofluoromethane, dichlorodifluoromethane, monobromotrifluoromethane, monochlorodifluoromethane, trichlorotrifluoroethane, dichlorotetrafluoroethane, octafluorocyclobutane, and tetrachlorodifluoroethane.

Preferred classes of liquids are those not miscible with water in all proportions such as aliphatic hydrocarbons having 3 to 6 carbon atoms and the halogen substituted alkane hydrocarbons having 1–2 carbon atoms and the halocycloalkanes having 3–4 carbon atoms.

The amount of volatile organic liquid used to impregnate the tobacco will depend upon a number of factors such as the physical state of the tobacco being treated, the particular organic liquid used and the degree of impregnation desired. Generally speaking, the amount of liquid used is that which will thoroughly impregnate the tobacco without leaving any substantial excess of liquid which can be separated and drained away from the body of tobacco treated. Generally speaking, the amount of liquid used to achieve such impregnation will range between about one-third [to] *and* about three times the amount of tobacco treated on a weight basis. Expressed in another way, the weight ratio of liquid to tobacco may be between 1-to-3 and 3-to-1.

After the tobacco has been impregnated with the organic liquid, it is preferred that the tobacco be allowed to equilibrate, i.e., remain in contact, with the liquid for a period of time. Here again this time will depend upon the physical state of the tobacco and the particular liquid that may be selected for impregnation. In the case of leaf, stems or strips, the contact time may be longer than for the treatment of more finely divided tobacco particles such as cut filler. Periods from a few minutes to as long as 24 hours are satisfactory.

The temperature and pressure conditions under which the tobacco is contacted with the organic liquid do not appear to be critical, and generally speaking, ordinary room temperatures and pressures are entirely satisfactory. As a matter of fact, a feature of the invention is that no special equipment is required for subjecting the tobacco to the initial impregnation step and it may be carried out in any suitable type of tank, drum or other container. However, in the case of liquids having a low boiling point or high vapor pressure, the equilibration should be carried out at reduced temperatures or elevated pressures so that the liquid does not vaporize or escape during the equilibration step.

After the tobacco has become thoroughly impregnated with the organic liquid, a hot gas is passed through the tobacco in order to rapidly vaporize the liquid. The hot gas is preferably steam but may be any other gas which is inert to the tobacco and the volatile liquid. As previously indicated, the temperature of the gas is preferably 30° F. above the boiling point of the organic liquid and it is rapidly passed through the body of [the] impregnated tobacco in order to effect rapid vaporization of the liquid from the tobacco. This causes expansion without concomitant fragmentation of the tobacco particles. This step in the process is also preferably carried out under ordinary pressures and in any convenient type of equipment. The hot gas is passed through the tobacco until substantially all of the volatile liquid has been vaporized and then driven off in the form of a vapor. Where low boiling liquids such as pentane or Freon-11 are used, steam at about 212° F. may be used. With the high boiling liquids the temperature of the hot gas can be higher (e.g., superheated steam). Gas temperatures above about 400° F. should be avoided since they may adversely affect the flavor and aroma of the tobacco being treated.

By the process of this invention it is possible to increase the filling capacity of cured tobacco by as much as 20 to 100 percent or even more. This tobacco product, having decreased bulk density, is particularly useful for the manufacture of smoking products such as cigarettes, cigars and pipe tobacco. The bulk density having been decreased, considerable savings in tobacco cost are obtained in the manufacture of these smoking products without sacrificing quality.

In order to measure the filling capacity of a cut filler tobacco product as described in the following examples, a compressometer is used which is essentially composed of a cylinder 9.5 centimeters in diameter with a graduated scale on the side. A piston 9.4 centimeters in diameter slides in the cylinder. Pressure is applied to the piston and volume in milliliters of a given weight of tobacco, 100 grams, is determined. Experiments have shown that this apparatus will accurately determine the volume (filling capacity) of a given amount of cut tobacco with good reproducibility. The pressure on the tobacco applied by the piston in all examples was 2.30 pounds per square inch applied for five seconds, at which time the volume reading was taken. This pressure corresponds closely to the pressure normally applied by the wrapping paper to tobacco in cigarettes. The moisture content of the tobacco affects the filling capacity values determined by this method, therefore comparative filling capacities were obtained at similar moisture contents.

For a more complete understanding of this invention, reference will now be made to several examples which are illustrative thereof:

EXAMPLE 1

A cured cut cigarette tobacco containing 12.3 percent moisture and having a filling capacity of 458 milliliters when determined by the procedure previously indicated was mixed with a sufficient amount of ethanol (boiling point about 173° F. ) to thoroughly impregnate the tobacco. The alcohol-treated tobacco was equilibrated in a closed container for about 20 hours, after which time a stream of steam having a temperature of 212° F. was passed through the alcohol-treated tobacco for a period of five minutes. After this time the tobacco had expanded and the alcohol had been completely removed by vaporization. The moisture content of the tobacco was then adjusted to 10.9 percent. The resulting tobacco was suitable for use in the manufacture of cigarettes and had a filling capacity of 517 milliliters, which represents an increase of approximately 12.9 percent over the original tobacco.

EXAMPLE 2

The procedure of Example 1 was repeated except that acetone (B.P., about 134° F.) was used as the volatile organic liquid and the treated tobacco was steamed for three minutes with the final moisture content being adjusted to 11.1 percent. The filling capacity was 533 milliliters, representing an increase of approximately 19.7 percent over the untreated tobacco.

EXAMPLE 3

The process of Example 1 was repeated except that ethyl ether (B.P., about 94.2° F.) was used as the liquid, the steaming was carried out for two minutes, and the moisture content of the final tobacco was adjusted to 9.7 percent. The filling capacity of the tobacco product was 614 milliliters, representing an increase of approximately 34.1 percent.

EXAMPLE 4

The process of Example 1 was repeated except that the organic liquid was benzene (B.P., about 176° F.) and the treated tobacco was steamed for five minutes and the moisture content of the final product was adjusted to 12.0 percent. The filling capacity of the product was 522 milliliters, representing an increase of approximately 14.0 percent.

EXAMPLE 5

The process of Example 1 was repeated using hexane (B.P., about 156° F.) as the organic liquid, steaming for five minutes and adjusting the moisture content of the final product to 12.1 percent. The filling capacity was 576 milliliters, representing an increase of approximately 25.8 percent.

EXAMPLE 6

The process of Example 1 was repeated except that pentane (B.P., about 95° F.) was the organic liquid, the product was steamed for two minutes, and the moisture content of the final tobacco was adjusted to 12.1 percent. The filling capacity was 704 milliliters, representing an increase of approximately 53.7 percent.

EXAMPLE 7

The process of Example 6 was repeated except that the steaming was carried out for only one minute and the moisture content was adjusted to 9.6 percent. The filling capacity of the final tobacco was 921 milliliters, representing an increase of approximately 101.0 percent.

EXAMPLE 8

The process of Example 1 was repeated utilizing dichloromethane (B.P., about 104° F.) as the liquid and steaming for 75 seconds, with final moisture readjustment to 10.0 percent. The filling capacity of the product was 605 milliliters, corresponding to an increase of approximately 32.2 percent.

EXAMPLE 9

The process of Example 1 was repeated employing Freon-11 (trichloromonofluoromethane, B.P., about 75° F.) as the organic liquid. The mixture of tobacco and Freon-11 was stored under slight superatmospheric pressure to prevent vaporization during the equilibration process. After storage, steaming was effected for two minutes and the moisture in the final product was adjusted to 10.1 percent. The filling capacity of the final tobacco was 682 milliliters, representing an increase of approximately 46.8 percent.

EXAMPLE 10

Shredded flue-cured tobacco stems (200 grams) were treated with 250 milliliters of pentane and equilibrated overnight in a closed container. The treated tobacco was then exposed to steam at 212° F. for a period of one minute and dried in air. The moisture content of the resulting tobacco was 13.5 percent and its filling capacity was 921 milliliters. A control sample which had not been treated with the pentane had a moisture content of 14.0 and a filling capacity of 466 milliliters. Thus, the filling capacity due to the pentane treatment followed by steaming was increased approximately 98.6 percent.

EXAMPLE 11

The experiment of Example 10 was repeated except that ethyl ether was used as the organic liquid. The moisture content of the final tobacco was 14.0 percent and the filling capacity was 563 milliliters, representing an increase of approximately 21 percent over the control.

EXAMPLE 12

The experiment of Example 10 was repeated using shredded burley tobacco stems with pentane as the organic liquid. The final product had a moisture content of 12.5 percent and a filling capacity of 1036 milliliters. The control which had not been subjected to pentane had a moisture content of 12.6 percent and a filling capacity of 743 milliliters. Thus, the pentane-treated and steamed sample showed an increase in filling capacity over the control of approximately 39.4 percent.

EXAMPLE 13

The process of Example 12 was repeated using shredded burley tobacco stems and ethyl ether as the organic liquid. The final moisture content was 13.1 percent and the filling capacity was 821 milliliters, representing a 10.5 percent increase over the control.

EXAMPLE 14

A sample (2633 grams) of flue-cured tobacco strips was equilibrated with 4500 milliliters pentane in a closed container for 20 hours. Small batches (100 grams or less) of the pentane-treated tobacco were then exposed to steam at 212° F. in a wire mesh basket for five to thirty seconds and then dried in air. The resulting expanded strips were shredded in the conventional manner and the tobacco was fabricated into cigarettes. Control cigarettes were made from untreated strips and the physical characteristics of the cigarettes from the expanded and untreated flue-cured tobaccos are compared in the following table:

| Determination[1] | Control[2] | Expanded[2] |
|---|---|---|
| Weight, g | 1.036 | 0.769 |
| Draft resistance, in | 2.10 | 2.26 |
| Firmness, 0.1 mm | 8.83 | 9.58 |
| Circumference, mm | 25.33 | 25.27 |
| Moisture, % | 12.08 | 12.20 |

[1]Data based on average of 50 cigarettes (70 mm).
[2]Cigarettes stored at 63% humidity for 94 hours.

While steam has been indicated in the foregoing examples as the hot gas for volatilizing the liquid in the moistened tobacco, it will be readily apparent that other heated gases such as nitrogen, carbon dioxide, methane, etc., which are inert to the tobacco and to the liquid may be employed. Also, if desired, superheated steam may be employed to advantage to effect a more rapid vaporization and removal of the organic liquid, particularly those having higher boiling points.

Those modifications and equivalents which fall within the spirit of the invention and the scope of the appended claims are to be considered part of the invention.

I claim:

1. A process for increasing the filling capacity of tobacco which comprises contacting tobacco with a sufficient quantity of a volatile organic liquid to impregnate same, thereafter without substantially increasing the pressure rapidly passing a gas into contact with said impregnated tobacco, said gas being heated to a temperature of at least 30° F. above the boiling point of said liquid at the gas contacting pressure, whereby said liquid in the tobacco is essentially completely and rapidly vaporized within said tobacco and said tobacco is expanded and separating the vaporized liquid from the tobacco in the vapor state.

2. The process of claim 1 in which said gas is steam.

3. The process of claim 1 in which the weight ratio of liquid to tobacco in the gas contacting step is between about 3 to 1 and 1 to 3.

4. The process of claim 1 in which the liquid is a halogenated hydrocarbon.

5. The process of claim 1 in which the liquid is a fluorohydrocarbon.

6. The process of claim 1 in which the liquid is a hydrocarbon.

7. A process for increasing the filling capacity of tobacco which comprises admixing tobacco with a volatile organic liquid, the amount of liquid being sufficient to wet the tobacco *but insufficient to leave any substantial excess of liquid which can be separated and drained away from said tobacco*, equilibrating the mixture to permit the liquid to substantially completely impregnate the tobacco particles, rapidly passing a stream of gas through the tobacco while still wet with said liquid, said gas having a temperature at least 30° F. above the boiling point of said liquid at the pressure at which the gas is passed through the tobacco, whereby the liquid is rapidly removed therefrom in the vapor state and the tobacco is expanded and separating the vaporized liquid from the tobacco.

8. The process of claim 1 in which the organic liquid is trichloromonofluoromethane.

*9. The process of claim 7 in which the amount of liquid admixed with said tobacco is in the range between about one-third and about three times the weight of the tobacco.*

*10. The process of claim 7 in which the liquid is a halogenated hydrocarbon.*

*11. A process for increasing the filling capacity of tobacco which comprises admixing tobacco with trichloromonofluoromethane liquid, the amount of liquid being sufficient to wet the tobacco but insufficient to leave any substantial excess of liquid which can be separated and drained away from said tobacco, equilibrating the mixture to permit the liquid to substantially completely impregnate the tobacco particles, rapidly passing a stream of gas through the tobacco while still wet with said liquid, said gas having a temperature at least 30° F. above the boiling point of said liquid at the pressure at which the gas is passed through the tobacco, whereby the liquid is rapidly removed therefrom in the vapor state and the tobacco is expanded and separating the vaporized liquid from the tobacco.*

* * * * *